(12) United States Patent
Barr et al.

(10) Patent No.: US 6,445,553 B2
(45) Date of Patent: *Sep. 3, 2002

(54) METHOD AND SYSTEM FOR FABRICATING A HIGH DENSITY MAGNETORESISTIVE DEVICE

(75) Inventors: Ronald Barr, Mountain View, CA (US); Robert E. Rottmayer, Pittsburgh, PA (US)

(73) Assignee: Read-Rite Corporation, Fremont, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,330

(22) Filed: Apr. 2, 1999

(51) Int. Cl.[7] .................................................. G11B 5/39
(52) U.S. Cl. ....................................................... 360/320
(58) Field of Search ................................ 360/326, 327, 360/322, 320

(56) References Cited

U.S. PATENT DOCUMENTS

| | | | |
|---|---|---|---|
| 4,443,294 A | 4/1984 | Suenaga et al. | 156/656 |
| 5,467,881 A | 11/1995 | Gill | 216/22 |
| 5,475,550 A | 12/1995 | George | 360/113 |
| 3,485,334 A | 1/1996 | Nix et al. | 360/113 |
| 5,495,378 A | 2/1996 | Bonyhard et al. | 204/192.35 |
| 5,554,265 A | 9/1996 | Bonyhard et al. | 360/113 |
| 5,557,491 A * | 9/1996 | Gill et al. | 360/113 |
| 5,568,335 A | 10/1996 | Fontana et al. | 360/113 |
| 5,608,593 A | 3/1997 | Kim et al. | 360/113 |
| 5,634,260 A | 6/1997 | Nix et al. | 29/603.14 |
| 5,637,235 A | 6/1997 | Kim et al. | 216/22 |
| 5,641,557 A | 6/1997 | Ishiwata | 428/209 |
| 5,658,469 A | 8/1997 | Jennison | 216/22 |
| 5,664,316 A | 9/1997 | Chen et al. | 29/603.08 |
| 5,669,133 A | 9/1997 | George | 29/603.16 |
| 5,673,162 A | 9/1997 | Saito | 360/113 |
| 5,700,380 A | 12/1997 | Krounbi et al. | 216/22 |
| 5,701,221 A | 12/1997 | Taniyama et al. | 360/113 |
| 5,739,987 A | 4/1998 | Yuan et al. | 360/113 |

* cited by examiner

*Primary Examiner*—George J. Letscher
(74) *Attorney, Agent, or Firm*—Sawyer Law Group LLP (57) ABSTRACT

A system and method for providing a device for reading data is disclosed. The device includes a magnetoresistive element. The method and system include providing a read gap, providing a plurality of leads, and providing an insulator. The read gap covers at least a portion of the magnetoresistive element. The plurality of leads is electrically coupled with the magnetoresistive element. The insulator electrically isolates a portion of each of the plurality of leads. In one aspect, the read gap is formed in a first process and the insulator is formed in a second process decoupled from the first process.

19 Claims, 8 Drawing Sheets

METHOD AND SYSTEM FOR FABRICATING A HIGH DENSITY MAGNETORESISTIVE DEVICE

FIELD OF THE INVENTION

The present invention relates to magnetoresistive heads and more particularly to a method and system for decoupling a read gap and lead insulation, allowing magnetoresistive devices to be used in higher density recording applications.

BACKGROUND OF THE INVENTION

Magnetic recording technology utilizes magnetoresistive ("MR") devices in order to read data stored on a magnetic recording media, such as a disk. Conventional MR devices include a MR element which has a resistivity that depends upon the magnetization of the MR element. The MR element could be a giant magnetoresistive ("GMR") element such as a spin valve or an anisotropic magnetoresistive (AMR) element, such as permalloy. Such devices also include electronics which translate the change in resistivity of the MR element into a signal that indicates the state of a bit being read.

In addition, to the MR element, the conventional MR device includes a pair of leads connected to the MR element. The leads carry current to and from the MR element. The signal from the MR element due to the bit being read is proportional to the current carried by the MR element. The MR device also has a pair of gaps separating the MR element from a pair of magnetic shields. The shields ensure that the MR element is primarily exposed to the field from a particular bit being read. Thus, the distance between the shields is determined by the track width of bits being read. The MR element and leads are electrically isolated from the shields by the pair of gaps.

A trend in magnetic recording technology is to higher areal density in storage. In order to increase the density of data storage, the track width is decreased. The length of bits being read is also decreased. Thus, the width of the MR element may be decreased. The spacing between the shields decreases in order to magnetically isolate the MR element from bits not currently being read.

As the spacing between the shields decreases, the thickness of the gaps also decreases. As the gap decreases in thickness, there is a higher probability that the leads will be shorted to the shield. As a result, the MR device will not function. In the conventional MR device, a portion of the leads may also overlap the MR element. Current is shunted away from the MR element through the leads near the overlap. As the width of the MR element decreases, this overlap becomes a higher fraction of the width of the MR element. The fraction of current shunted away from the MR element also increases. This reduces the signal from the MR element, making it more difficult for the conventional MR device to read bits.

Accordingly, what is needed is a system and method for providing a higher density MR device. It would also be desirable for the MR device to exhibit fewer losses due to current shunting. The present invention addresses such a need.

SUMMARY OF THE INVENTION

The present invention provides a method and system for providing a device for reading data. The device includes a magnetoresistive element. The method and system comprise providing a read gap, providing a plurality of leads, and providing an insulator. The read gap covers at least a portion of the magnetoresistive element. The plurality of leads is electrically coupled with the magnetoresistive element. The insulator electrically isolates a portion of each of the plurality of leads. In one aspect, the read gap is formed in a first process and the insulator is formed in a second process decoupled from the first process.

According to the system and method disclosed herein, the present invention decouples formation of the read gap from formation of the insulator. Thus, the read gap can be made thin without compromising insulation of the leads. The device to be used to read higher density data.

DETAILED DESCRIPTION OF THE INVENTION

The present invention relates to an improvement in magnetoresistive devices. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
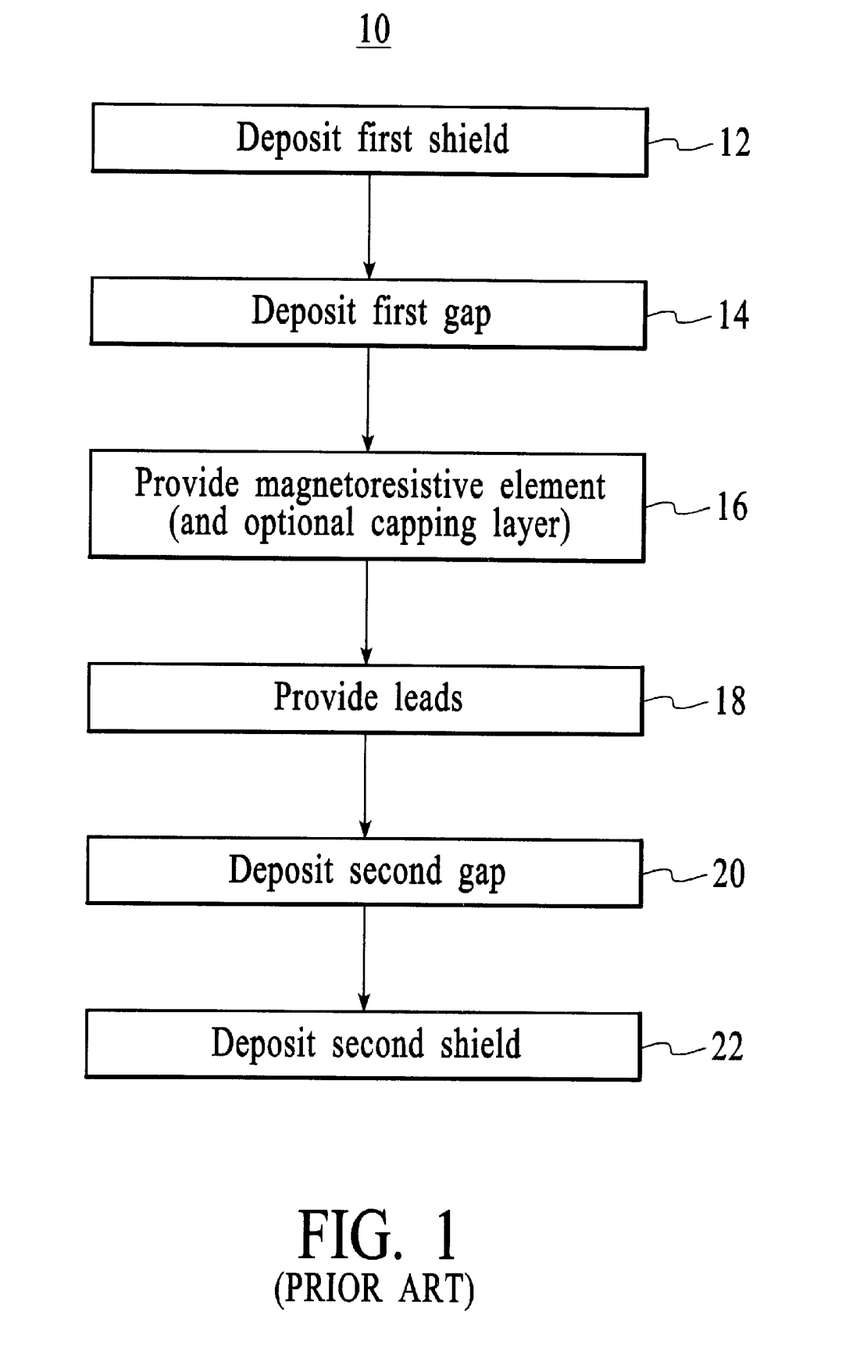
FIG. 1 is a flow chart depicting a conventional method for providing a magnetoresistive device.

FIG. 1 is a flow chart depicting a conventional method 10 for fabricating a conventional contiguous junction (CJ) defined magnetoresistive (MR) device. A first shield is provided, via step 12. A first gap is then deposited, via step 14. An MR element is then provided on the first gap, via step 16. Thus, the first gap electrically insulates the MR element from the first shield. In some conventional methods, formation of the MR element in step 16 may include providing an insulating capping layer for the MR element. Leads are then formed, via step 18. Note that if the method 10 were used to form a exchange defined MR device, not shown, an exchange layer would be deposited at the edges of the MR element prior to deposition of the leads in step 18. A second gap and a second shield are then provided, via steps 20 and 22, respectively.

Figure 2:
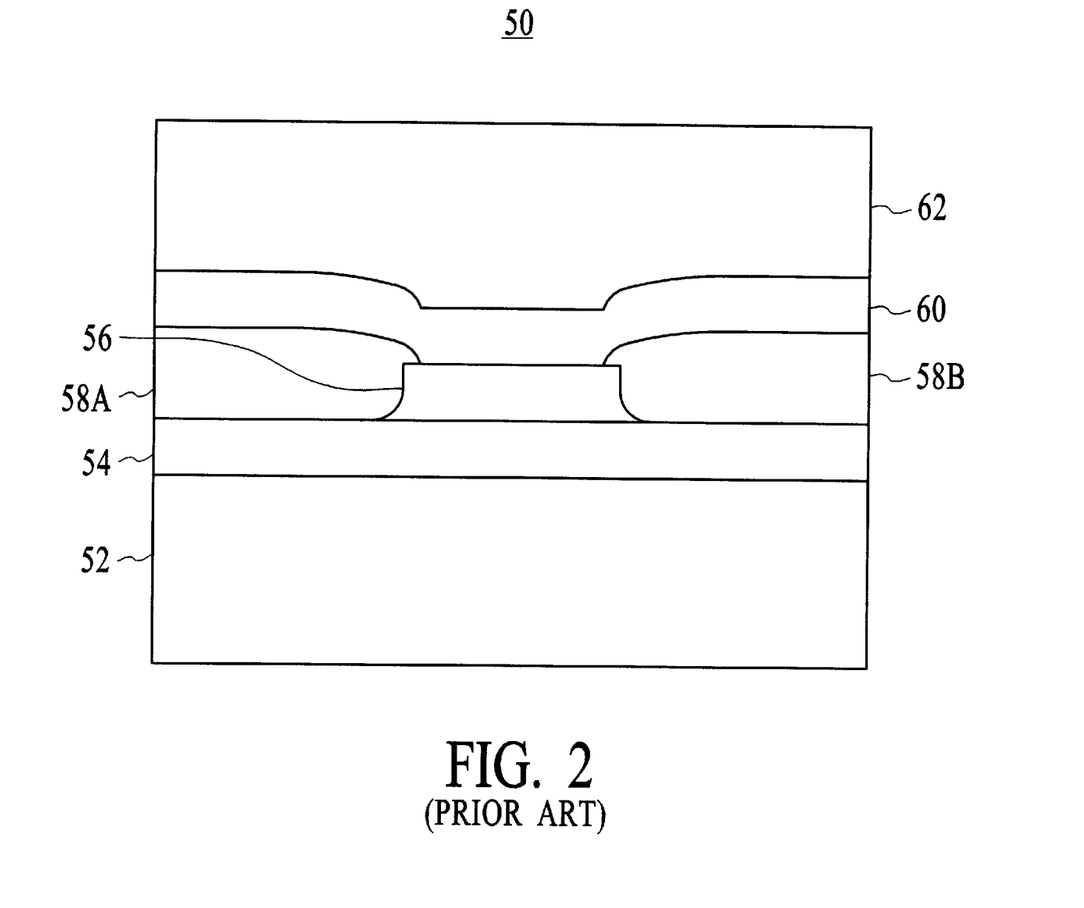
FIG. 2 is a block diagram of a conventional magnetoresistive device.

FIG. 2 depicts a portion of a conventional CJ defined MR device 50 formed using the method 10. The MR device 50 includes first and second shields 52 and 62, first and second gaps 54 and 60, an MR sensor 56 and leads 58A and 58B. The MR element 56 could be a giant magnetoresistance (GMR) element, such as a spin valve, or an anisotropic magnetoresistive (AMR) element. The leads 58A and 58B carry current to and from the MR element 56 and magnetically bias the MR element 56. The first and second gaps 54 and 60 electrically isolate the MR element 56 and the leads 58 from the first and second shields 52 and 62, respectively. Note that if the conventional MR device 50 was an exchange defined device, an exchange layer (not shown) would be included between the leads 58A and 58B and the first gap 54.

Although the conventional MR device 10 shown in FIG. 2 functions, those with ordinary skill in the art will realize that the trends in magnetic recording technology may lead to failures in the MR device 50 as well as losses in performance. Two trends in magnetic recording lead to decreases in the thickness of the second gap 60. One trend is toward recording media having higher areal densities. In order to read data from such recording media, the size of the portion of the MR device 50 shown in FIG. 2 should decrease. In particular, the spacing between the first shield 52 and the second shield 60, S, decreases. When S decreases, the thickness t of the second gap 60 may decrease as the MR device 50 scales down in size.

A second trend is to more complex MR elements 56. Typically, more complex MR elements are thicker. For example, some antiferromagnetic materials used in a spin valve function better when thicker. In addition, some layers of a spin valve may consist of two layers, making the MR element 56 thicker. Other MR elements 56 include dual spin valves and are, therefore, thicker. Thus, the MR element 56 may occupy a greater fraction of the distance S between the first shield 52 and the second shield 62. Even if the distance S between the first shield 52 and the second shield 62 does not decrease, use of a thicker MR element 56 may require that the thickness t of the second gap 60 be reduced. Thus, the use of more complex MR elements also leads to the use of a thinner second gap 60.

One of ordinary skill in the art will realize that when the thickness of the second gap 60 decreases, shorts between the leads 58A and 58B and the second shield 62 occur more frequently. Shorting causes the MR device 50 to fail. As t decreases, nonuniformities in the deposition of the second gap 60, such as pin holes, may allow a short to form between the second shield 62 and the leads 58A or 58B. In addition, as can be seen in FIG. 2, the topography of the MR device 50 near the MR element causes shadowing during deposition of the second gap 60. The second gap may be thinner in some areas near the edges of the MR element 56, making shorting between the leads 58A and 58B and the second shield 62 more probable. Finally, etching during formation of the MR element 56 may cause redeposition of the conductive material forming the MR element 56. Redeposition may also cause portion of the second gap 60 to be thinner, making shorting more likely.

One of ordinary skill in the art will also realize that increases in the areal density of the recording media may reduce the performance of the MR device 50 even if shorting between the leads 58A and 58B and the second shield 62 does not occur. The leads 58A and 58B both magnetically bias the MR element 56 and carry current to and from the MR element 56. The leads 58A and 58B also overlap the MR element 56. The overlap between the leads 58A and 58B and the MR sensor shunts current away from the MR element 56. The signal from a bit being read is proportional to the current through the MR element 56. Thus, the overlap reduces the magnitude of the signal. Moreover, the actual structure of the overlap may not be determinable. The portion of the MR element 56 beneath the overlap may not properly magnetically biased. This may cause unpredictable artifacts in the signal.

At larger sizes, the overlap occupies a small fraction of the MR element 56. Thus, the losses and artifacts in the signal may be relatively small. As areal density increases, however, the width of the MR element 56 (the distance between leads 58A and 58B) may decrease. The overlap of the leads 58A and 58B and the MR element 56 may not scale with decreases in size of the MR element 56. This is because the overlap of the leads 58A and 58B on the MR element 56 may not be controllable. Thus, the overlap may occupy a larger fraction of the MR element 56. Therefore, the relative losses and artifacts in the signal increase. Performance of the MR device 50 suffers.

Note that in some conventional MR devices 50, a capping layer is provided on the MR element 56. The capping layer is provided prior to the leads 58A and 58B and the second gap 60. This capping layer may be an insulator. Thus, the effects of the overlap may be reduced. However, the additional capping layer adds to the spacing between the first shield 52 and the second shield 62. For example, the capping layer may be on the order of fifty Angstroms. The spacing S in current devices is on the order of five hundred to six hundred Angstroms. The capping layer occupies a significant portion of the spacing S. Consequently, the thickness of the second gap 60 may be reduced, increasing the probability of shorting between the leads 58A and 58B and the second shield 62.

The present invention provides a method and system for providing a device for reading data. The device includes a magnetoresistive element. The method and system comprise providing a read gap, providing a plurality of leads, and providing an insulator. The read gap covers at least a portion of the magnetoresistive element. The plurality of leads is electrically coupled with the magnetoresistive element. The insulator electrically isolates a portion of each of the plurality of leads. In one aspect, the read gap is formed in a first process and the insulator is formed in a second process decoupled from the first process. Moreover, the description of a method in accordance with the present invention may omit steps for the sake of clarity.

The present invention will be described in terms of a particular magnetoresistive device made using a particular process. However, one of ordinary skill in the art will readily recognize that this method and system will operate effectively for other devices and other processes consistent with the present invention. In addition, the present invention will be described in the context of forming a magnetoresistive device. However, one of ordinary skill in the art will readily realize that the present invention is consistent with forming a large number of magnetoresistive devices. The present invention is also discussed in the context of spin valve devices used in high density recording applications. However, one of ordinary skill in the art will readily realize that the present invention can be used with other magnetoresistive elements.

Figure 3:
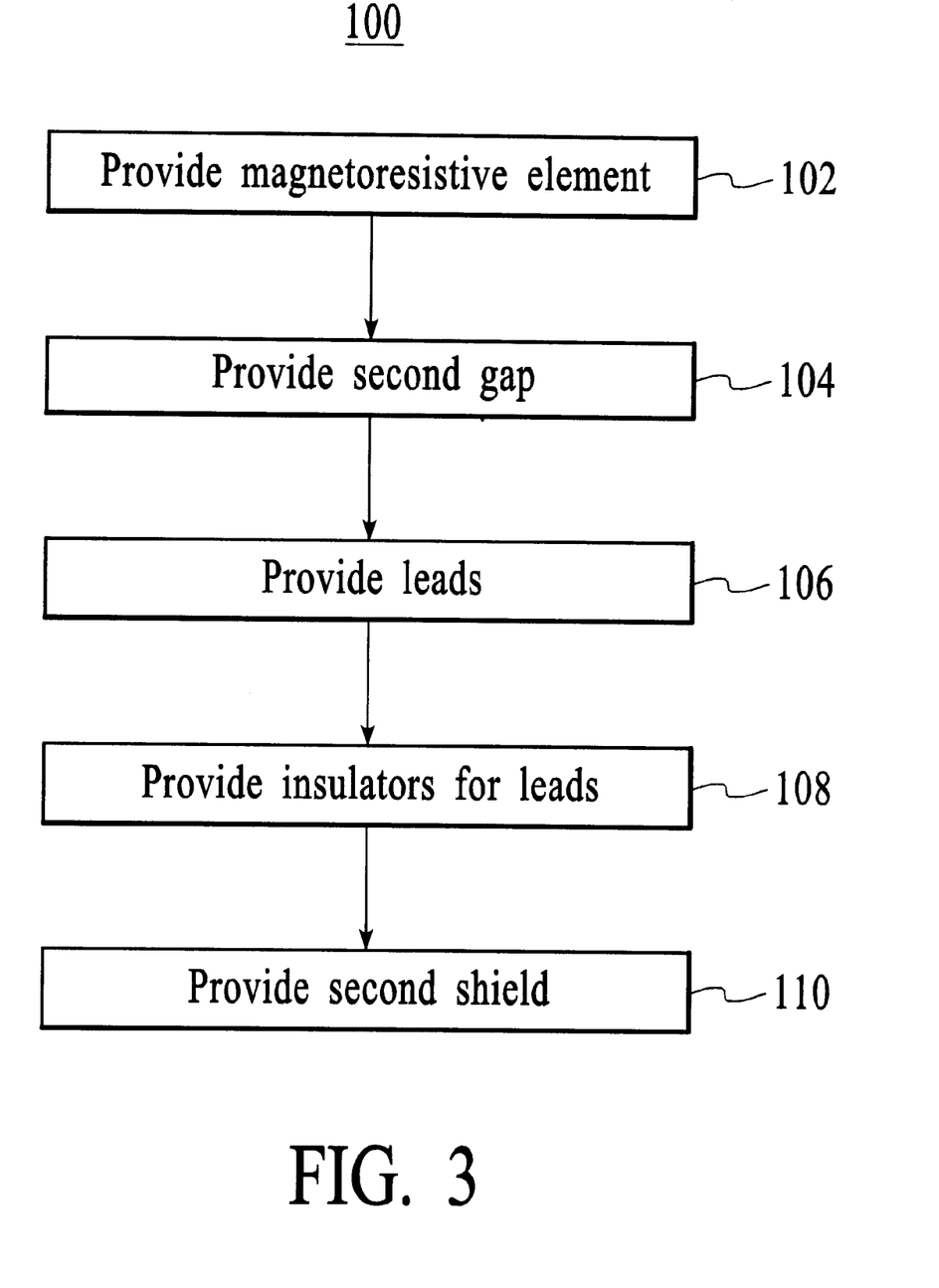
FIG. 3 is a flow chart depicting a method for providing a magnetoresistive device in accordance with the present invention.

To more particularly illustrate the method and system in accordance with the present invention, refer now to FIG. 3 depicting a flow chart of a method 100 in accordance with the present invention. The method commences after the first shield and first gap have been provided. The MR element is provided, via step 102. In a preferred embodiment, the MR element is a spin valve, utilizing giant magnetoresistance in sensing data. However, in an alternate embodiment, the MR element is an anisotropic magnetoresistive (AMR) element. The second gap is provided, via step 104. The leads are then provided via step 106. In an exchange defined device, an exchange layer is provided prior to deposition of the leads in step 108. In a CJ defined device, the leads provided in step 106 also magnetically bias the MR element. An insulator for each of the leads is then provided, via step 108. The insulator does not substantially overlap the second gap provided in step 106. A second shield is then provided, via step 110.

Because providing the gap is provided in a separate step from the insulator, the gap can be made significantly thinner than the insulator. As a result, the spacing between the first and second shields near the MR element may be made smaller. At the same time, the spacing away from the MR element may be larger. Because the spacing between the shields near the MR element can be small, the MR device can be used in higher density applications. This is because the portion of the shields near the MR element can still isolate the MR element from the magnetic field of bits not currently being read. In addition, the larger spacing between the shields near the leads allows the leads to be better insulated. Thus, shorting is reduced while allowing the device to be used in higher density recording applications.

Figure 4:
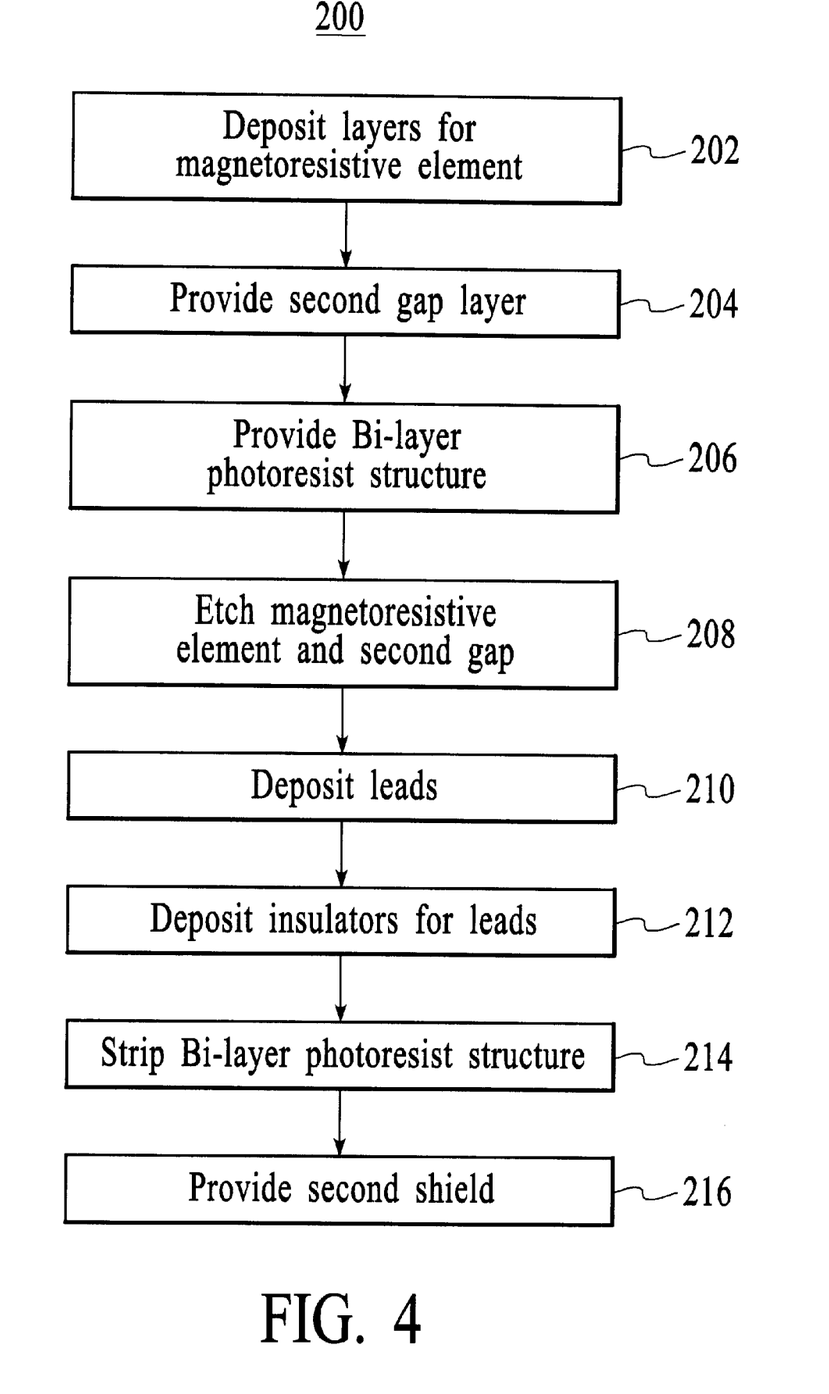
FIG. 4 is a flow chart depicting a method more detailed for providing a continuous junction defined magnetoresistive device in accordance with the present invention.
Figure 5A:
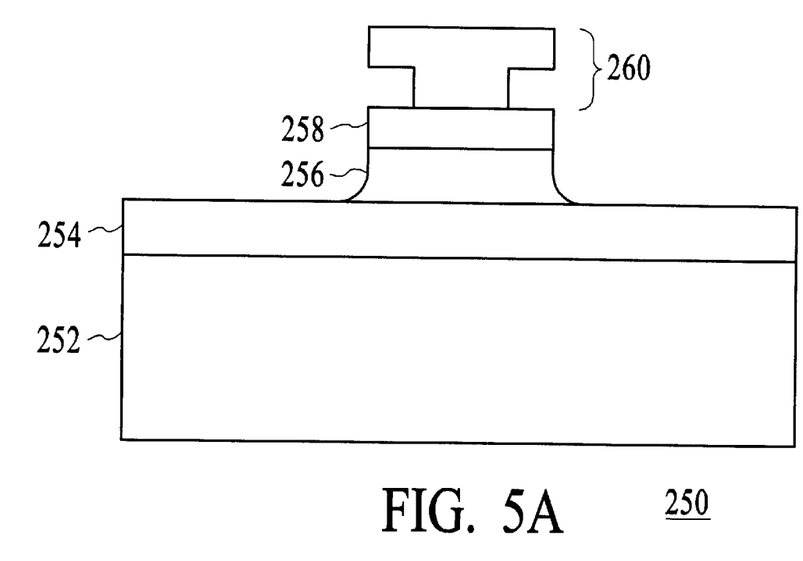
FIG. 5A is a block diagram of a continuous junction defined magnetoresistive device in accordance with the present invention during fabrication.
Figure 5B:
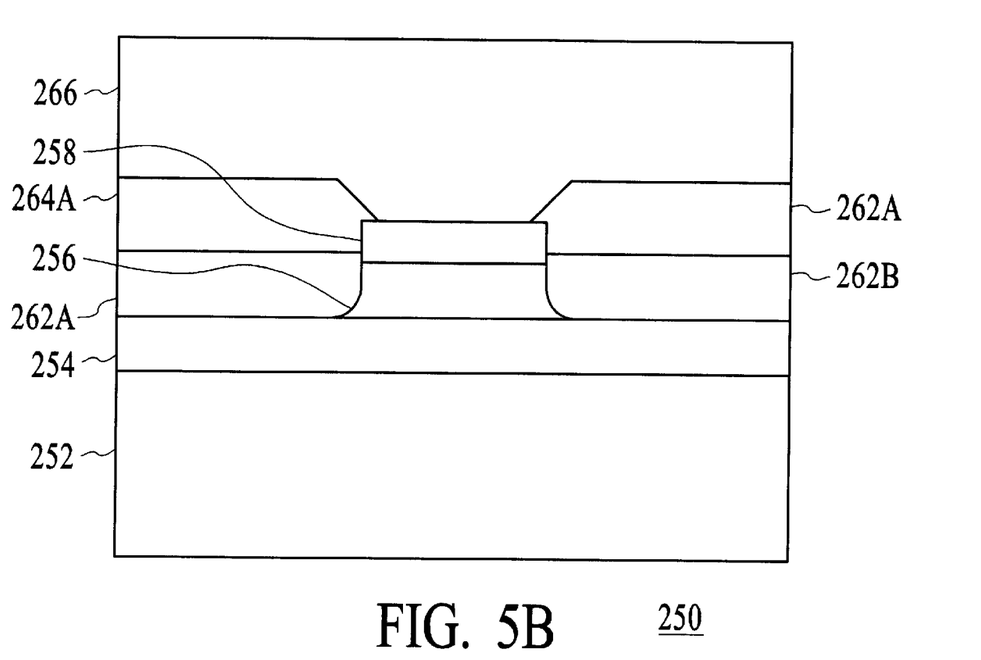
FIG. 5B is a block diagram of a continuous junction defined magnetoresistive device in accordance with the present invention.

FIG. 4 depicts a more detailed flow chart of a method 200 for providing a CJ defined device in accordance with the present invention. FIGS. 5A–5B depict a CJ defined device 250 in accordance with the method 200. Referring now to FIG. 4, the method 200 preferably commences after a first shield and a first gap have been provided. The layer(s) which will form the MR element are deposited, via step 202. In a preferred embodiment, step 202 includes depositing layers of a spin valve. The second gap is then deposited, via step 204. A bi-layer photoresist structure is then provided, via step 206. In a preferred embodiment, step 206 includes providing a first photoresist layer, providing a pattern on the layer, and developing the resist to leave the first layer of the bi-layer structure. In such an embodiment, step 206 also includes providing a second photoresist layer, providing a pattern on the second layer, and developing the second photoresist to leave the bi-layer structure. Note, however, that in an alternate embodiment, a bi-layer structure need not be used. The MR layers, deposited in step 202, and the second gap are then etched, via step 208. Thus, the MR element and second gap are delineated in step 208.

FIG. 5A depicts the CJ defined device 250 after completion of step 208. The CJ defined device 250 includes a first shield 252, a first gap 254, an MR element 256, and a second gap 258. The CJ defined device 250 is also depicted with a bi-layer photoresist structure 260. The second gap 258 and the MR element 256 are aligned because the same bi-layer photoresist structure 260 is used as a mask for both the MR element 256 and the second gap 258.

Referring back to FIG. 4, the leads are then provided, via step 210. The leads deposited in step 210 also magnetically bias the MR element 256. An insulator for each of the leads is provided, via step 212. The bi-layer photoresist structure 260 is then stripped, via step 214. The second shield is then provided, via step 216.

FIG. 5B depicts the CJ defined device 250 after completion of step 216. The CJ defined device 250 also includes leads 262A and 262B, insulators 264A and 264B, and a second shield 266. Because the leads 262A and 262B and the insulators 264A and 264B are provided before the bi-layer photoresist structure 260 is stripped, the leads 262A and 262B and the insulators 264A and 264B do not substantially overlap MR element 256 or the second gap 258.

Because the gap 258 is decoupled from the insulators 264A and 264B, the second gap 258 can be made much thinner than the insulators 264A and 264B. Thus, the spacing between the first shield 252 and the second shield 266 can be made smaller near the MR element 256 without compromising insulation of the leads 262A and 262B. For the same reason, the MR element 256 could be made thicker or more complex without substantially increasing the risk of shorting between the leads 262A or 262B and the second shield 266. Thus, more complex MR element 256 may be used and the CJ defined device 250 may be used in higher density recording applications.

In addition, because the second gap 258 is deposited prior to the leads 262A and 262B, the leads 262A and 262B do not substantially overlap the MR element 256. Thus, the effects due to the overlap, discussed above, may be substantially eliminated. Thus, the CJ defined device 250 may be scaled down without concern about increasing the relative effects of the overlap. Moreover, this is accomplished without using an additional capping layer between the MR element 256 and the second gap 258. Such an additional capping layer would add approximately fifty Angstroms to the spacing between the first shield 252 and the second shield 266, which is on the order of six hundred Angstroms or less. Thus, the small spacing between the first shield 252 and the second shield 266 can be preserved. Consequently, the CJ defined device 250 remains useful for high density recording applications.

Figure 6:
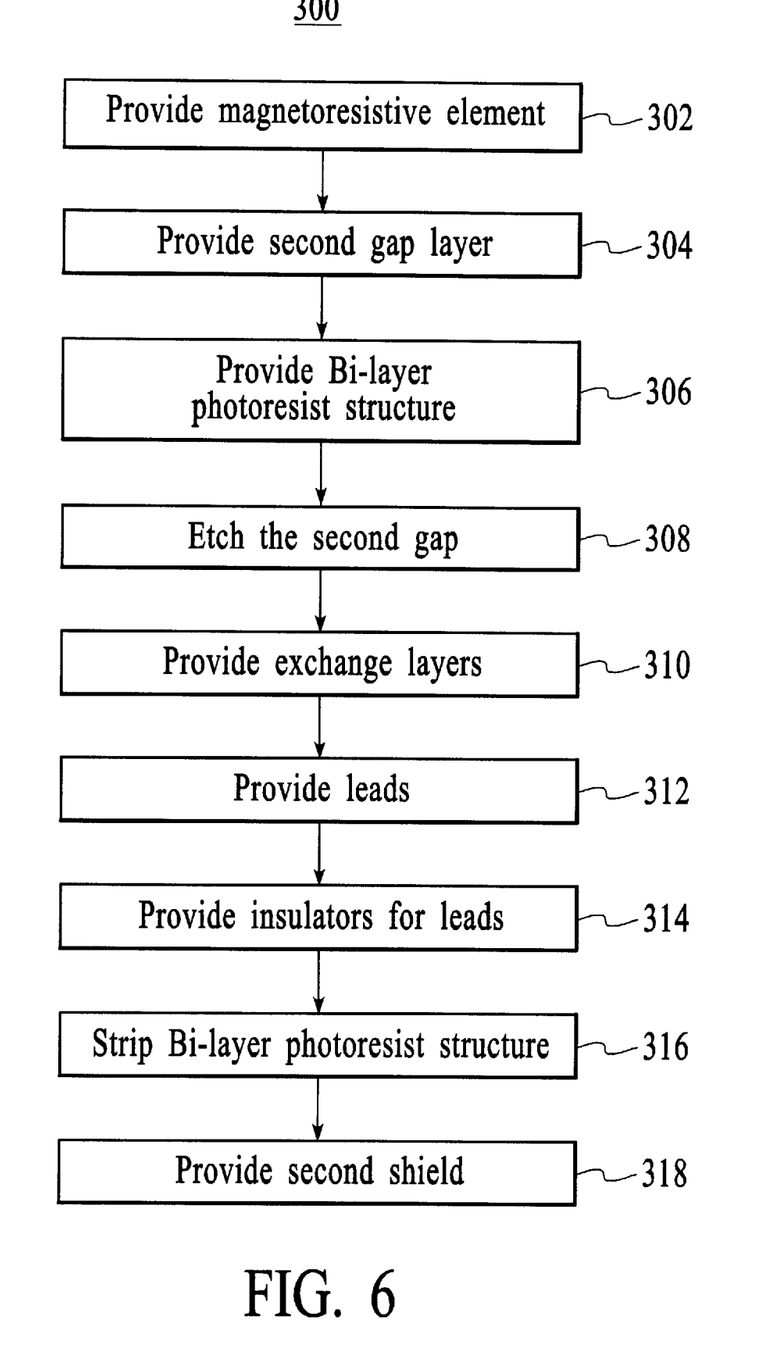
FIG. 6 is a flow chart depicting a more detailed method for providing an exchange defined magnetoresistive device in accordance with the present invention.
Figure 7A:
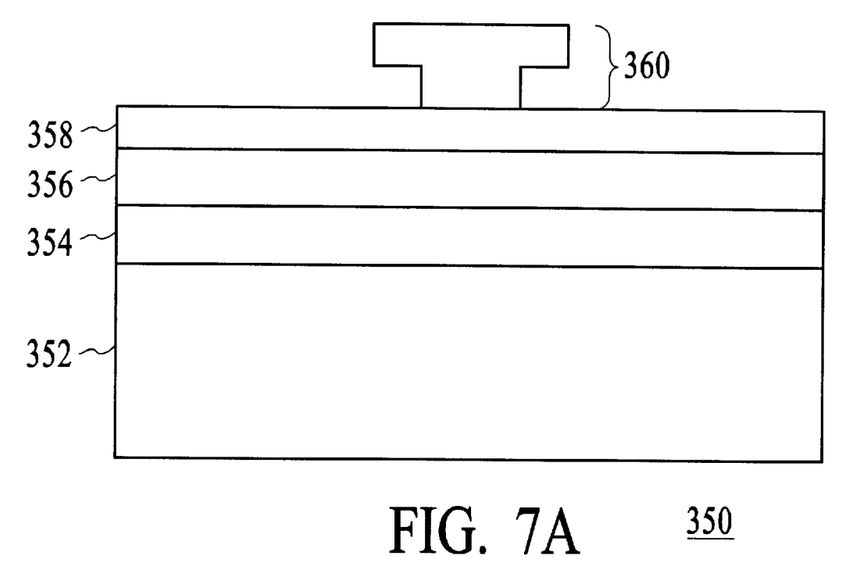
FIG. 7A is a block diagram of an exchange defined magnetoresistive device in accordance with the present invention before etching of the second gap during fabrication.
Figure 7B:
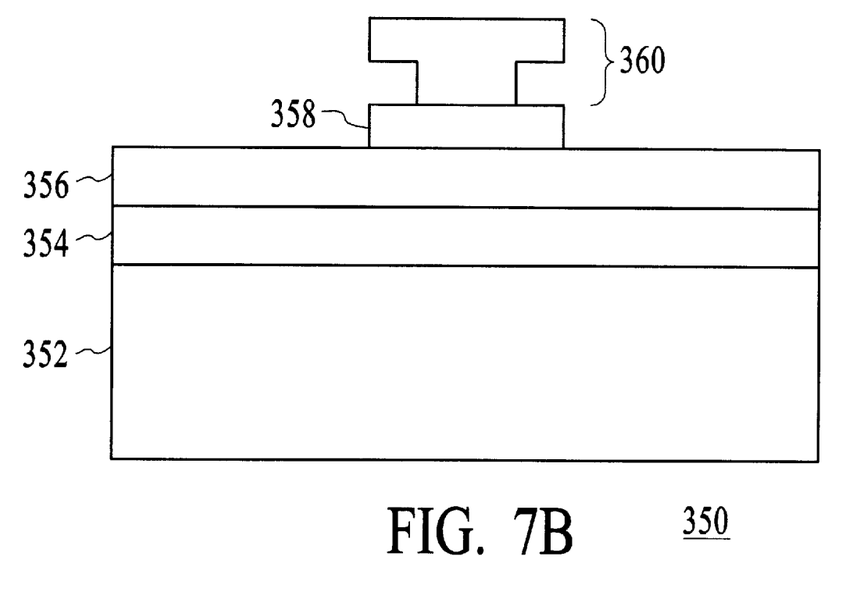
FIG. 7B is a block diagram of an exchange defined magnetoresistive device in accordance with the present invention after etching of the second gap during fabrication.
Figure 7C:
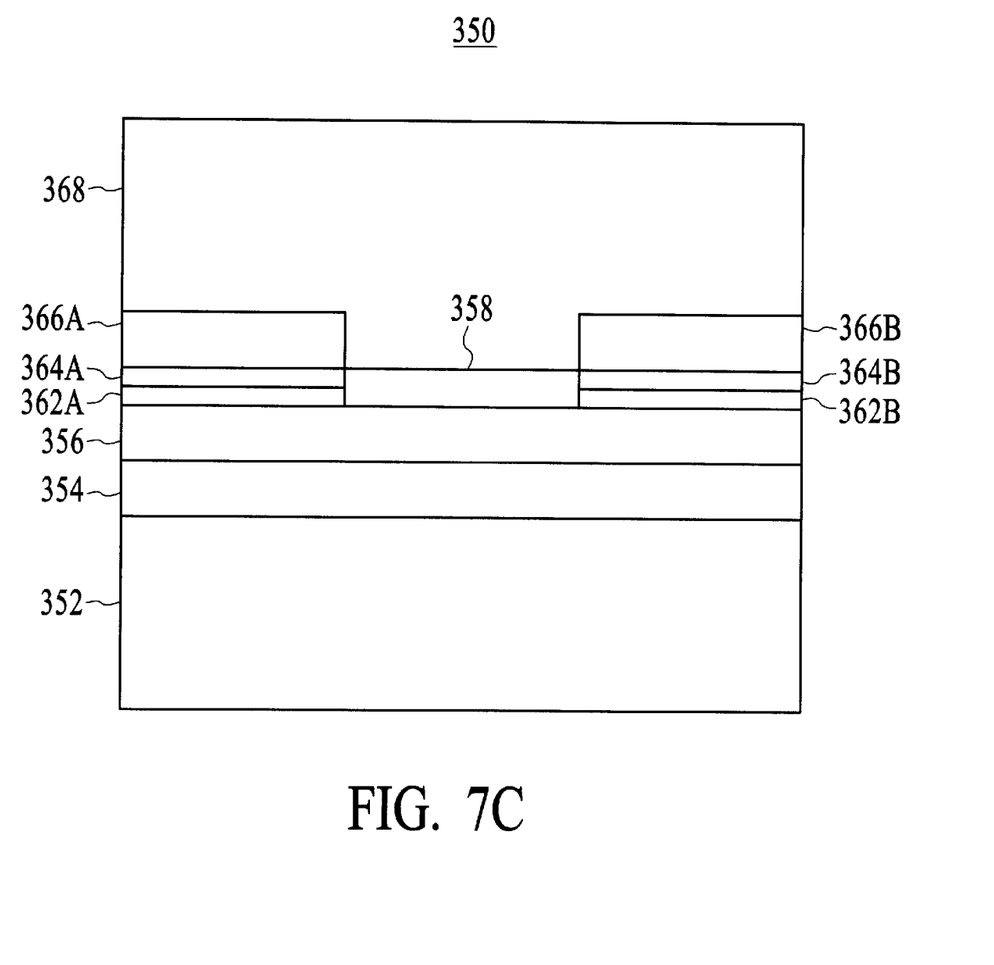
FIG. 7C is a block diagram of an exchange defined magnetoresistive device in accordance with the present invention.

FIG. 6 depicts a more detailed flow chart of a method 300 used for providing an exchange defined device. FIGS. 7A through 7C depict the exchange-defined device 350 at various stages in processing. Referring now to FIG. 6, the method 300 preferably commences after a first shield and a first gap have been provided. The MR element is provided via step 302. The second gap is then deposited via step 304. A bi-layer photoresist structure is then provided, via step 306. In a preferred embodiment, step 306 includes providing a first photoresist layer, providing a pattern on the layer, and developing the resist to leave the first layer of the bi-layer structure. In such an embodiment, step 306 also includes providing a second photoresist layer, providing a pattern on the second layer, and developing the second photoresist to leave the bi-layer structure. Note, however, that in an alternate embodiment, a bi-layer structure need not be used.

FIG. 7A depicts the exchange-defined device 350 after step 306 is completed. The exchange defined device 350 includes a first shield 352, a first gap 354, an MR element 356, and a second gap layer 358. A bi-layer photoresist structure 360 is also depicted. Referring back to FIG. 6, the second gap layer 358 is then etched, via step 308. Thus, the etch performed in step 308 stops substantially at the surface of the MR element 356. In one embodiment, step 308 is performed using a reactive ion etch that etches the second gap 358 but stops at the MR element 356.

Refer now to FIG. 7B, which depicts the exchange defined device 350 after step 308 is completed. The second gap 358 has been defined by the bi-layer photoresist structure 360 and the etch performed in step 308.

Referring back to FIG. 6, the exchange layer which magnetically biases the MR element 256 is then deposited, via step 310. The leads are provided, via step 312. The insulator for each of the leads is then provided, via step 314. Once the leads have been provided in step 314, the bi-layer photoresist structure 360 is stripped. The second shield is then provided, via step 318.

Refer now to FIG. 7C, which depicts the exchange defined device 350 after completion of step 318. The exchange defined device 350 includes exchange layers 362A and 362B, leads 364A and 364B, insulators 366A and 366B, and a second shield 368. Because the exchange layers 362A and 362B, the leads 364A and 364B, and insulators 366A and 366B are deposited while the bi-layer photoresist structure 360 is in place, they do not overlap the interface between the second gap 358 and the MR element 356.

Because the gap 358 is decoupled from the insulators 366A and 366B, the second gap 358 can be made much thinner than the insulators 366A and 366B. Thus, the spacing between the first shield 352 and the second shield 368 can be made smaller near the MR element 356 without compromising insulation of the leads 364A and 364B. For the same reason, the MR element 356 could be made thicker or more complex without substantially increasing the risk of shorting between the leads 364A or 364B and the second shield 368. Thus, a more complex MR element 356 may be used and the exchange-defined device 350 may be used in higher density recording applications.

In addition, because the second gap 358 is deposited prior to the leads 364A and 364B, the leads 364A and 364B do not substantially overlap the MR element 356. Thus, the effects due to the overlap, discussed above, may be substantially eliminated. Thus, the exchange-defined device 350 may be scaled down without concern about increasing the relative effects of the overlap. Moreover, this is accomplished without using an additional capping layer between the MR element 356 and the second gap 358. Such an additional capping layer would add approximately fifty Angstroms to the five to six hundred Angstrom spacing between the first shield 352 and the second shield 368. Thus, the exchange defined device 350 remains useful for high density recording applications.

A method and system has been disclosed for providing an MR device which can be used for higher density recording applications. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a device for reading data, the device including a magnetoresistive element for sensing the data, a first read gap and a first shield, the first read gap being on the first shield and the magnetoresistive element being on the first read gap, the method comprising the steps of:
   (a) providing a second read gap covering at least a portion of the magnetoresistive element;
   (b) providing a plurality of leads electrically coupled with the magnetoresistive element;
   (c) providing an insulator for electrically isolating a portion of each of the plurality of leads, the insulator covering the leads substantially without overlapping the second read gap; and
   (d) providing a second shield above to the second read gap and a portion of the insulator, the insulator electrically isolating a portion of each or the plurality of leads from the second shield, the second read gap a butting and between the magnetoresistive element and the second shield;
   wherein the second read gap providing step (a) and the insulator providing step (c) are decoupled.

2. The method of claim 1 wherein the step of providing the plurality of leads (b) further includes the step of:
   (b1) providing the plurality of leads after the second read gap providing step (a) and before the insulator providing step (c).

3. The method of claim 2 wherein the second read gap has a first thickness and wherein insulator providing step (c) further includes the step of:
   (c1) depositing an insulating layer substantially covering the plurality of leads and having a second thickness, the second thickness being greater than the first thickness.

4. The method of claim 2 wherein the plurality of leads further magnetically bias the magnetoresistive element.

5. The method of claim further comprising the step of:
   (e) depositing an exchange layer prior to depositing the leads, the exchange layer covering a second portion of the magnetoresistive element, the exchange layer for magnetically biasing the magnetoresistive element.

6. The method of claim 2 wherein the magnetoresistive element further includes a giant magnetoresistive element.

7. The method of claim 1 wherein the lead providing step (b) further includes the step of:
   (b1) providing the plurality of leads such the each of the plurality of leads does not substantially overlap the magnetoresistive element.

8. A device for reading data, the device including a magnetoresistive element for sensing the data, a first read gap and a first shield, the first read gap being on the first shield and the magnetoresistive element being on the first read gap, the device comprising:
   a second read gap covering at least a portion of the magnetoresistive element;
   a plurality of leads coupled with the magnetoresistive element, the plurality of leads for carrying current to and from the magnetoresistive element;
   an insulator substantially covering a portion of each of the plurality of leads substantially without overlapping the second read gap; and
   a second shield above the second read gap and a portion of the insulator, the insulator electrically insulating the portion of each of the plurality of leads from the second shield, the second read gap a butting and between the magnetoresistive element and the second shield;
   wherein the second read gap is formed in a first process and the insulator is formed in a second process decoupled from the first process.

9. The device of claim 8 wherein the second read gap has a first thickness and the insulator has a second thickness, the second thickness being greater than the first thickness.

10. The device of claim 8 wherein the plurality of leads further magnetically bias the magnetoresistive element.

11. The device of claim 8 further comprising:
   an exchange layer covering a second portion of the magnetoresistive element, the exchange layer for magnetically biasing the magnetoresistive element.

12. The device of claim 8 wherein the magnetoresistive element further includes a giant magnetoresistive element.

13. The device of claim 8 wherein each of the plurality of leads does not substantially overlap the magnetoresistive element.

14. A magnetic recording system comprising:

a magnetic recording media for storing data; and a device for reading the data, the device including, a magnetoresistive element for sensing the data, a first read gap and a first shield, the first read gap being on the first shield and the magnetoresistive element being on the first read gap, a second read gap covering at least a portion of the magnetoresistive element, a plurality of leads coupled with the magnetoresistive element, an insulator substantially covering a portion of each of the plurality of leads substantially without overlapping the second read gap; and a second shield above the second read gap and a portion of the insulator, the insulator electrically insulating the portion of each of the plurality of leads from the shield;

wherein the second read gap is formed in a first process and the insulator is formed in a second process decoupled from the first process; and wherein, the second read gap a butting and between the magnetoresistive element and the second shield.

15. The system of claim 14 wherein the second read gap has a first thickness and the insulator has a second thickness, the second thickness being greater than the first thickness.

16. The system of claim 14 wherein the plurality of leads further magnetically bias the magnetoresistive element.

17. The system of claim 14 further comprising:

an exchange layer covering a second portion of the magnetoresistive element, the exchange layer for magnetically biasing the magnetoresistive element.

18. The system of claim 14 wherein the magnetoresistive element further includes a giant magnetoresistive element.

19. The magnetic recording system of claim 14 wherein each of the plurality of leads does not substantially overlap the magnetoresistive element.

* * * * *